(12) United States Patent
Walsdorf

(10) Patent No.: US 12,196,440 B2
(45) Date of Patent: Jan. 14, 2025

(54) WIDE INPUT-RANGE CONNECTED THERMOSTAT

(71) Applicant: Daniel B Walsdorf, Kiel, WI (US)

(72) Inventor: Daniel B Walsdorf, Kiel, WI (US)

(73) Assignee: Daniel Walsdorf, Kiel, WI (US)

( * ) Notice: Subject to any disclaimer, the term of this patent is extended or adjusted under 35 U.S.C. 154(b) by 273 days.

(21) Appl. No.: 17/744,003

(22) Filed: May 13, 2022

(65) Prior Publication Data

US 2023/0066603 A1 Mar. 2, 2023

Related U.S. Application Data

(60) Provisional application No. 63/237,673, filed on Aug. 27, 2021.

(51) Int. Cl.
| | |
|---|---|
| *F24F 11/523* | (2018.01) |
| *F24F 11/56* | (2018.01) |
| *F24F 120/10* | (2018.01) |
| *H02J 7/00* | (2006.01) |
| *H02M 7/06* | (2006.01) |

(52) U.S. Cl.
CPC .......... *F24F 11/523* (2018.01); *F24F 11/56* (2018.01); *H02J 7/00712* (2020.01); *H02M 7/06* (2013.01); *F24F 2120/10* (2018.01)

(58) Field of Classification Search
CPC ...... F24F 11/523; F24F 11/56; F24F 2120/10; H02J 7/0068; H02J 7/00712; H02M 7/06; H02M 7/062
See application file for complete search history.

(56) References Cited

U.S. PATENT DOCUMENTS

| | | | |
|---|---|---|---|
| 2015/0045959 A1* | 2/2015 | McPherson | G05D 23/1905 |
| | | | 700/276 |
| 2016/0238272 A1* | 8/2016 | Imes | H04W 84/10 |
| 2016/0327299 A1* | 11/2016 | Ribbich | G05B 15/02 |
| 2017/0034215 A1* | 2/2017 | Sigel | H04W 12/08 |
| 2018/0034268 A1* | 2/2018 | Motsenbocker | H02J 1/06 |
| 2019/0195523 A1* | 6/2019 | Mowris | F24F 11/61 |
| 2019/0310667 A1* | 10/2019 | Brown | G08B 21/18 |

* cited by examiner

*Primary Examiner* — Henry T Crenshaw

(57) ABSTRACT

A thermostat system for control of an HVAC (Heating, Ventilation and Air-Conditioning) system, the thermostat system comprising a power conversion module, the power conversion module further comprising a power input of either a direct-current voltage or an alternating-current voltage, a battery management system including a battery and a battery management circuit, the battery management circuit configured to select either the battery output voltage or the primary output voltage based on an operating condition, a communication module, a temperature monitor, one or more environmental sensors, a graphical user interface display, and a processor.

7 Claims, 2 Drawing Sheets

… (1)

WIDE INPUT-RANGE CONNECTED THERMOSTAT

FIELD OF THE INVENTION

The present disclosure relates to a connected thermostat supporting a wide range of input voltage supplies.

BACKGROUND OF THE INVENTION

Thermostat technology encompasses many different use cases that require differing input specifications. Home thermostat solutions require a 20-30V alternating-current (AC) input voltage. Thermostats for recreational vehicles (RVs) require a 12V direct-current (DC) input. Additionally, remote systems such as cellular base stations or off-grid homes or buildings may have unique power systems which have other input voltage requirements and which do not easily interface with existing thermostat solutions. Including discrete inverters or step-down or step-up converters can be an expensive solution which wastes valuable power.

In addition, HVAC systems operating in remote environments have further challenges. Without system access, users may be forced to set controls for a worst-case scenario and waste valuable energy. In the extreme, failure of the remote HVAC system can lead to catastrophic consequences, including ruin of inventory in a remote warehouse, failure of critical infrastructure such as cellular base stations, and even death of livestock or pets. Providing user access to control and monitor the HVAC system is critical for remote applications.

There is a need for a thermostat solution that is compatible with a wide range of both DC and AC input voltages, and provides a rich set of control and monitoring features.

SUMMARY OF THE INVENTION

In one or more embodiments, a thermostat system for climate control comprising a power conversion module, the power conversion module further comprising a power input of either a direct-current voltage or an alternating-current voltage, a battery management system including a battery and a battery management circuit, the battery management circuit configured to select either the battery output voltage or the primary output voltage based on an operating condition, a communication module, a temperature monitor, one or more environmental sensors, a graphical user interface display, and a processor.

DETAILED DESCRIPTION

Figure 1:
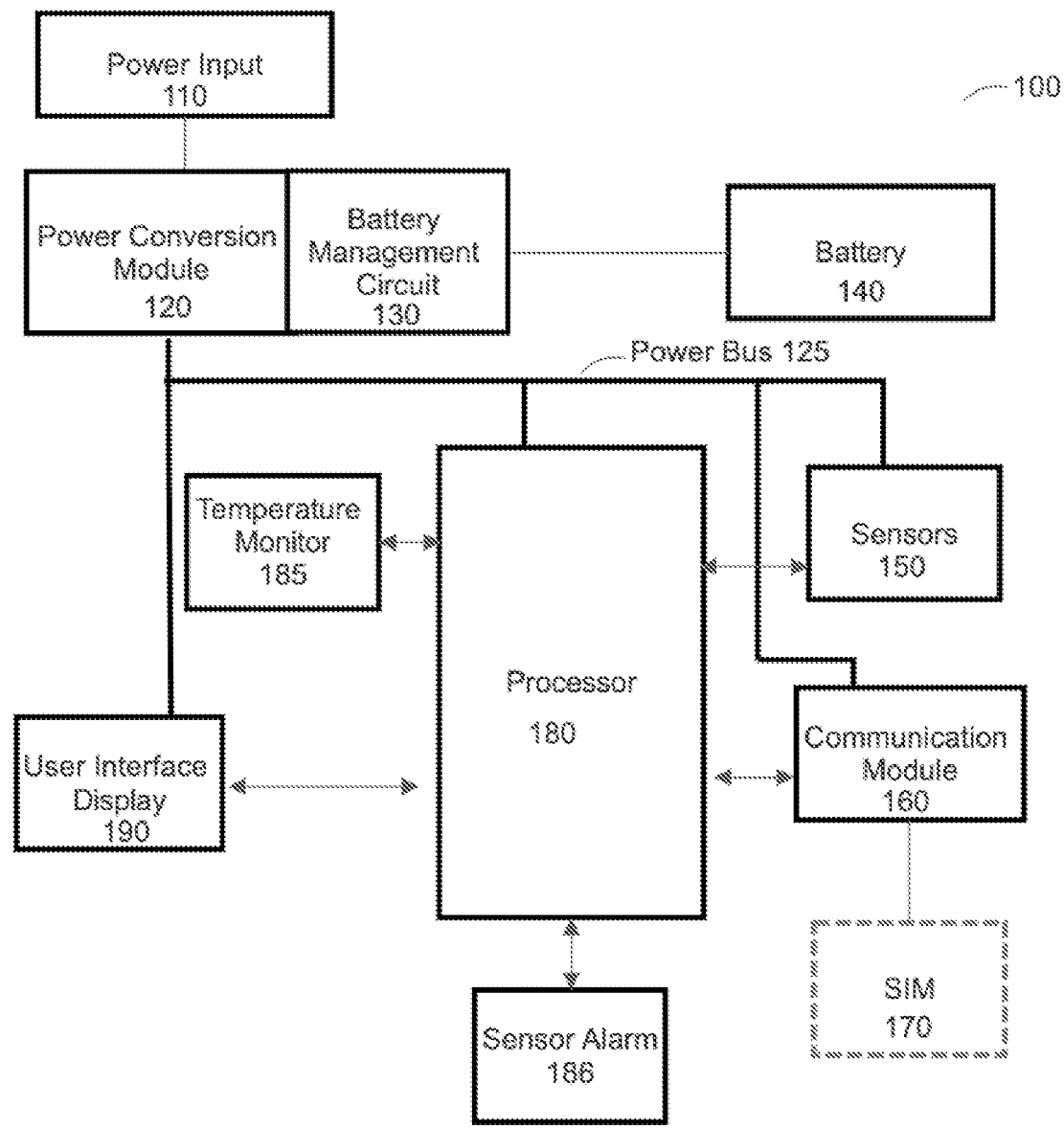
FIG. 1 is one embodiment of the thermostat system.

The following description includes specific details to provide an understanding of a thermostat system. Embodiments of the thermostat system described in the following description may be incorporated into other devices not disclosed in the following description. Structures and elements shown in the drawings are exemplary embodiments of the thermostat system and are not to be used to limit broader teachings of the thermostat system.

It is understood through the text of this disclosure that where elements are described as separate functional units, those skilled in the art will recognize that various elements or portions thereof may be integrated together. Where elements are described in the following description as integrated together into a combined element, those skilled in the art will similarly recognize that individual elements of the combination may be utilized as separate elements.

This specification includes references to "an embodiment of the thermostat system" or "one embodiment of the thermostat system". This language is intended to refer to the particular elements and structures of the embodiment being discussed in that portion of the specification. Where references are made to "an embodiment of the thermostat system" or "one embodiment of the thermostat system" in other portions of the specification, those similarly refer to those particular elements and structures of the embodiment being discussed in that portion of the specification. Embodiments discussed in different portions of the specification may or may not refer to the same embodiment of the thermostat system.

The use of specific terminology in the specification is used for best describing the thermostat system and shall not be construed as limiting. The terms "include", "including", "comprise" and "comprising" shall be understood to be open terminology and not limiting the listed items.

One embodiment of the thermostat system 100 is shown in FIG. 1. The thermostat system of FIG. 1 is capable to control an HVAC (Heating, Ventilation, and Air-Conditioning) unit. The thermostat system of FIG. 1 may be contained in a housing (not shown) capable to contain all components and be mounted on a wall or other surface. Power Input 110 accepts input from an external power source. In some embodiments, the external power source may be an alternating-current source supplying a voltage greater than or equal to 7.5 Volts and less than or equal to 32 Volts. In other embodiments, the external power source may alternatively be a direct-current source supplying a voltage greater than or equal to 7.5 Volts and less than or equal to 32 Volts. Those skilled in the art will appreciate that these voltage ranges are not meant to be limiting, and that in other embodiments, the external power source may be a supply of a specific voltage and current not specifically disclosed in this specification. Power Conversion Module 120 converts the incoming power supply from Power Input 110 into one or more voltages on Power Bus 125 to provide power to other modules in the system, including but not limited to Sensors 150, Communication Module 160, Processor 180, Temperature Monitor 185, Sensor Alarm 186, and User Interface Display 190. The embodiment of FIG. 1 is shown with a single line labelled Power Bus 125 connecting Power Conversion Module 120 to the other modules in the system, but those skilled in the art will appreciate that this connection may be a bus of multiple voltages, providing the appropriate unique voltage level to each of the other modules in the system.

Battery 140 provides additional power to the thermostat system during periods of heavy load, including but not limited to periods of network search and high-power amplification during periods of low network signal strength. During these periods of heavy load, including but not limited to periods when Communication Module 160 is performing a network search, Battery Management Circuit 130 may switch the power source for the system from Power Input 110 to Battery 140. During periods of normal loads, power to Power Bus 125 is provided by Power Conversion Module 120, and Battery Management Circuit 130 provides the appropriate voltage and current to Battery 140 to keep Battery 140 fully charged. The switching operation performed by Battery Management Circuit 130 may be accomplished using a relay, a semiconductor device switch, or any other element capable of switching the voltage levels present in Battery Management Circuit 130.

Processor 180 may receive a power input from Power Conversion Module 120 over Power Bus 125. Processor 180 may communicate with Sensors 150, which may include providing control signals to configure Sensors 150 for proper operation, and may additionally include receiving data from Sensors 150. In one embodiment, Sensors 150 may include a motion detector. The motion detector may send information representing a detection of motion to Processor 180. In response to receiving information representing a detection of motion, Processor 180 may send instructions to Communication Module 160 to communicate motion detection information outside the thermostat system, and Processor 180 may additionally communicate with User Interface Display 190 to illuminate an indicator or warning indicating detection of motion within the vehicle, home or other structure. Processor 180 may optionally activate Sensor Alarm 186.

Processor 180 may communicate with Temperature Monitor 185. Temperature Monitor 185 may be a thermistor, thermocouple, or any other device or apparatus capable of measuring ambient temperature. The output of Temperature Monitor 185 may be input to Processor 180 as part of a thermostat control loop. Processor 180 may provide control to enable or disable portions of a HVAC system (not shown) to maintain a constant temperature.

Processor 180 may communicate information from the thermostat control loop to Communication Module 160. Communication Module 160 may communicate information from the thermostat control loop to external devices. Information communicated by Communication Module 160 may include, but is not limited to, current temperature, desired temperature, current state of the HVAC system and warning indicators. In one embodiment, Communication Module 160 may include a cellular radio transceiver for communication of thermostat control loop information. Communication Module 160 may communicate to a cloud-based storage device over a cellular protocol, the cellular protocol including but not limited to CDMA, GSM, 3G, 4G, 5G, or other protocols not specifically listed here. SIM card 170 may provide cellular network access. A remote user may access thermostat control loop information from the cloud-based storage device using a cellular phone, tablet, or other device capable of communicating with the cloud-based storage device. In this manner, a remote user may have access to temperature and state information while located in a remote location from the thermostat and HVAC system. A remote user may also communicate information, including but not limited to new desired temperature settings or enable or disable instructions, to the thermostat system through a cellular connection from user's device, to the cloud-based storage device, and on to the thermostat system 100 over a cellular network.

In another embodiment, Communication Module 160 may include a wireless radio transceiver for communication of thermostat control loop information. Communication Module 160 may communicate with a network access point over the wireless protocol, the wireless protocol including but not limited to 802.11a, 802.11b, 802.11g, 802.11n, or other protocols not specifically listed here. The network access point may communicate with a cloud-based storage device over TCP/IP or another network protocol. A remote user may access thermostat control loop information from the cloud-based storage device using a cellular phone, tablet, or other device capable of communicating with the cloud-based storage device. In this manner, a remote user may have access to temperature and state information while located in a remote location from the thermostat and HVAC system. A remote user may also communicate information, including but not limited to new desired temperature settings or enable or disable instructions, to the thermostat system through a wireless connection from user's device, to the cloud-based storage device, and on to the thermostat system 100 over a wireless network.

Figure 2:
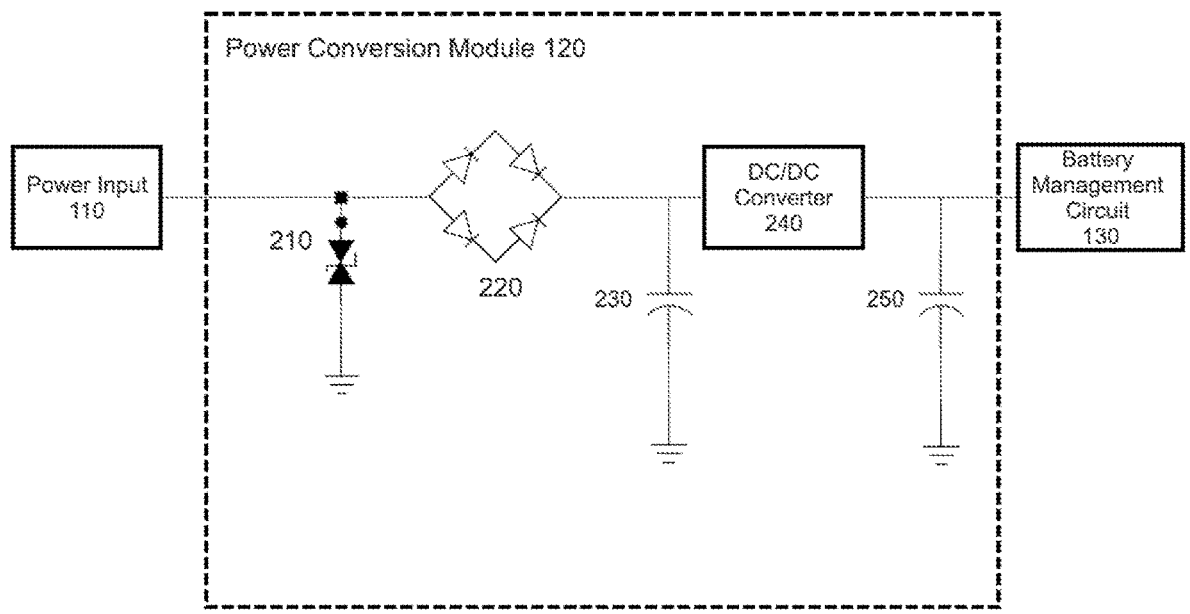
FIG. 2 is a detailed circuit implementation of the Power Conversion Module.

Shown in FIG. 2 is one embodiment of Power Conversion Module 120. Power Input 110 accepts input from an external power source. In some embodiments, the external power source may be an alternating-current source supplying a voltage greater than or equal to 7.5 Volts and less than or equal to 32 Volts. In other embodiments, the external power source may be a direct-current source supplying a voltage greater than or equal to 7.5 Volts and less than or equal to 32 Volts. Those skilled in the art will appreciate that these voltage ranges are not meant to be limiting, and that in other embodiments, the external power source may be a supply of a specific voltage and current not specifically disclosed in this specification. Diode 210 protects Bridge Circuit 220 and other downstream circuitry from damage caused by excessive voltage or current spikes on Power Input 110. The disclosed system may exist in a larger system, including but not limited to vehicles, commercial structures or residential units. This larger system may introduce high-voltage transients on Power Input 110 which may damage electronic circuits without presence of Diode 210. Diode 210 may be a Transient Voltage Suppression (TVS) diode or other diode structure capable to suppress high-voltage transients on Power Input 110.

Bridge 220 may convert voltage on Power Input 110 to a DC voltage. FIG. 2 shows Bridge 220 as a diode-based bridge rectification circuit, but other embodiments of Bridge 220 may use other circuit structures known in the art to convert an incoming voltage to a pulsed, rectified signal. In the embodiment of FIG. 2, an AC voltage may be converted to a rectified pulse at the output of Bridge 220. In other embodiments, a DC voltage input to Bridge 220 may be passed to the output of Bridge 220 after a voltage drop through the diode structure of Bridge 220. In this manner, the disclosed thermostat system may accept either an AC input voltage or a DC input voltage. Bulk capacitor 230 provides filtering on the output of Bridge 220 to smooth the transient response and reduce unwanted EMI effects in the system. DC/DC Converter 240 transforms the DC voltage at its input into the correct voltage level for Battery Management Circuit 130 and regulates the voltage to a constant level. The output voltage of DC/DC Converter 240 may be a voltage level required to operate Battery Management Circuit 130, including but not limited to a voltage equal to or greater than 7 Volts, and less than or equal to 28 Volts. DC/DC Converter 240 may be implemented as a buck converter, a buck-boost converter, a boost converter, or another DC/DC converter architecture known in the art. Capacitor 250 is a filter capacitor for the output of DC/DC Converter 240, which improves the accuracy of the output of DC/DC Converter 240. Capacitor 250 may be a ceramic capacitor, an electrolytic capacitor, or any other capacitor structure known in the art.

The capability to accept both DC and AC voltage levels enables the thermostat system to be used in many diverse applications. The thermostat system may be used to control a DC-powered HVAC system in a van, truck, recreational vehicle, boat, yacht or other marine watercraft, an ACpowered system in a residential or commercial building, or a DC battery-powered system operating an off-grid commercial or residential facility. The thermostat system may include a standard mounting bracket to enable easy removal and installation. In one embodiment, an owner may use the thermostat system in a van, truck or recreational vehicle during travel to control the interior temperature of the vehicle. Upon arrival at a residential facility, including but not limited to a cabin, yurt, home or other shelter, the thermostat system housing may be removed from the mounting bracket in the vehicle and installed in a mounting bracket in the residential facility. In this manner, a single thermostat system may enable control of HVAC systems in different locations. In another embodiment, multiple thermostat systems may be installed in each location, allowing simultaneous monitoring and control of multiple facilities.

I claim:

1. A thermostat system for climate control comprising:
   a power conversion module further comprising,
      an external power input comprising a direct-current voltage of greater than 7.5V and less than 32V or an alternating-current voltage of greater than 7.5V and less then 32V;
      a power output coupled to a power bus;
   a battery and a battery management circuit, the battery management circuit configured to select an output from either the battery output voltage or the external power input based on an operating condition;
   a communication module,
   a temperature monitor,
   one or more motion detectors,
   a graphical user interface display, and
   a processor.

2. The system of claim 1, wherein the battery management circuit selects the battery output voltage when the operating condition is a high-power operating condition of the system.

3. The system of claim 2, wherein the communication module communicates with a remote server using a cellular radio protocol.

4. The system of claim 2, wherein the communication module communicates with a remote server using a WiFi protocol.

5. The system of claim 1, wherein the processor accepts input from the temperature monitor and the environmental sensor and provides status information to the graphical user interface.

6. The system of claim 5, wherein the processor further communicates status information to the communication module.

7. The system of claim 6, wherein the system is contained within a housing which is mountable on a bracket and removable from the bracket.

* * * * *